United States Patent
Li et al.

(10) Patent No.: US 11,942,600 B2
(45) Date of Patent: Mar. 26, 2024

(54) ELECTROLYTE, LITHIUM-ION BATTERY COMPRISING ELECTROLYTE, BATTERY MODULE, BATTERY PACK AND DEVICE

(71) Applicant: Contemporary Amperex Technology Co., Limited, Ningde (CN)

(72) Inventors: Yongkun Li, Ningde (CN); Kai Wu, Ningde (CN); Bo Cheng, Ningde (CN); Feng Ju, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 146 days.

(21) Appl. No.: 17/565,474

(22) Filed: Dec. 30, 2021

(65) Prior Publication Data
US 2022/0123364 A1    Apr. 21, 2022

Related U.S. Application Data (63) Continuation of application No. PCT/CN2020/113973, filed on Sep. 8, 2020.

(30) Foreign Application Priority Data

Sep. 10, 2019    (CN) .......................... 201910854407.3

(51) Int. Cl.
*H01M 10/0567*    (2010.01)
*H01M 10/0525*    (2010.01)
(Continued)

(52) U.S. Cl.
CPC ... *H01M 10/0567* (2013.01); *H01M 10/0525* (2013.01); *H01M 10/0568* (2013.01); *H01M 10/4235* (2013.01); *H01M 2300/0025* (2013.01)

(58) Field of Classification Search
None
See application file for complete search history.

(56) References Cited

U.S. PATENT DOCUMENTS

| 2001/0006751 A1 | 7/2001 | Gan et al. |
| 2012/0244414 A1* | 9/2012 | Inagaki ............. H01M 10/0567 429/188 |

(Continued)

FOREIGN PATENT DOCUMENTS

| CN | 103597647 A | 2/2014 |
| CN | 105006594 | 10/2015 |

(Continued)

OTHER PUBLICATIONS

Huang, Tao, et al. "3, 3'-sulfonyldipropionitrile: A novel additive to improve the high temperature performance of lithium-ion battery." Electrochimica Acta, vol. 156, Jan. 7, 2015, pp. 328-335, https://doi.org/10.1016/j.electacta.2015.01.006. (Year: 2015).*

(Continued)

*Primary Examiner* — Robert S Carrico
(74) *Attorney, Agent, or Firm* — East IP P.C.

(57) ABSTRACT

In the embodiments of the present application, an electrolyte, a lithium-ion battery comprising the electrolyte, a battery module, a battery pack, and a device are provided. The electrolyte in the embodiments of the present application comprises an organic solvent, an electrolyte lithium salt dissolved in the organic solvent, and an additive comprising a first additive and a second additive. The first additive is selected from one or more of the compounds represented by formula I, and the second additive is selected from one or more of the compounds represented by formula II. After applying the electrolyte of the present application to a lithium-ion battery, the lithium ion battery has a better cycle (Continued)

performance and storage performance at a high temperature, and lower direct-current impedance at a low temperature, such that the lithium ion battery has both a better high-temperature performance and a better low-temperature performance.

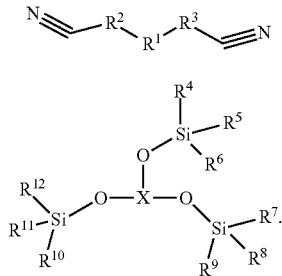

Formula I

Formula II

7 Claims, 3 Drawing Sheets

(51) Int. Cl.
*H01M 10/0568* (2010.01)
*H01M 10/42* (2006.01)

(56) References Cited

U.S. PATENT DOCUMENTS

| | | |
|---|---|---|
| 2015/0221976 A1 | 8/2015 | Lim et al. |
| 2015/0244030 A1 | 8/2015 | Ye et al. |
| 2016/0164143 A1* | 6/2016 | Sawa ................ H01M 4/587 429/188 |
| 2017/0301952 A1* | 10/2017 | Changlong ....... H01M 10/0525 |

FOREIGN PATENT DOCUMENTS

| | | |
|---|---|---|
| CN | 105261788 A | 1/2016 |
| CN | 105845983 A | 8/2016 |
| CN | 107293784 A | 10/2017 |
| CN | 107359368 A | 11/2017 |
| CN | 105 0479 95 B | 5/2018 |
| CN | 108539267 | 9/2018 |
| CN | 108666623 A | 10/2018 |
| CN | 110611121 A | 12/2019 |
| JP | 5392261 B2 | 1/2014 |
| WO | 2010018814 A1 | 2/2010 |
| WO | WO-2010018814 A1 * | 2/2010 .......... H01M 10/052 |

OTHER PUBLICATIONS

Zheng, Xiangzhen, et al. "3, 3'-sulfonyldipropionitrile: A novel electrolyte additive that can augment the high-voltage performance of Lini1/3CO1/3MN1/3O2/graphite batteries." Journal of Power Sources, vol. 319, Apr. 18, 2016, pp. 116-123, https://doi.org/10.1016/j.jpowsour.2016.04.053. (Year: 2016).*
The International search report for PCT Application No. PCT/CN2020/113973, dated Dec. 10, 2020, 14 pages.
The First Office Action for China Application No. 201910854407.3, dated Jul. 31, 2020, 10 pages.
The Second Office Action for China Application No. 201910854407.3, dated Jan. 18, 2021, 7 pages.
The extended European search report for European Application No. 20863544.1, dated Aug. 4, 2022, 8 pages.

* cited by examiner

ELECTROLYTE, LITHIUM-ION BATTERY COMPRISING ELECTROLYTE, BATTERY MODULE, BATTERY PACK AND DEVICE

CROSS-REFERENCE TO RELATED APPLICATION

The present application is a continuation of International Application No. PCT/CN2020/113973, filed on Sep. 8, 2020, which claims priority to Chinese Patent Application No. 201910854407.3 entitled "Electrolyte, and Lithium-Ion Battery Comprising Same" filed on Sep. 10, 2019, both of which are incorporated herein by reference in their entireties.

TECHNICAL FIELD

The present application relates to the field of batteries, and particularly relates to electrolytes, lithium-ion batteries comprising the electrolytes, battery modules, battery packs and devices.

BACKGROUND

With the rapid development of new energy vehicles with consumer electronics and rechargeable batteries as the power system, people have higher and higher requirements for batteries. Compared with lead-acid batteries, nickel-metal hydride batteries, and nickel-cadmium batteries, lithium batteries have the advantages of high specific energy density, wide operating temperature range and long cycle life, making them a mainstream position in the market for a long time.

With the widespread application of lithium-ion batteries, higher requirements have been put forward for their environmental adaptability. However, current electronic products sometimes have to be used in environments with high or low temperatures. Compared with conventional environments, the performance of lithium-ion batteries will deteriorate significantly when used under extreme conditions.

As an important part of the lithium-ion battery, electrolyte has a significant impact on the high temperature performance and low-temperature performance of the lithium-ion battery. However, it is difficult for the electrolyte to improve the high-temperature performance and low-temperature performance of lithium-ion batteries simultaneously. On the one hand, although passivation of the positive electrode by introducing film-forming additives can improve the high-temperature performance of lithium-ion batteries, conventional additives will deteriorate the impedance of the positive electrode, make the power performances of lithium-ion batteries poor at low temperatures; on the other hand, optimizing the electrolyte solvent composition ratio reduces the viscosity of the electrolyte at low temperatures to improve the low-temperature performance. However, this method will deteriorate the high-temperature gas production of lithium-ion batteries and cannot effectively solve the application issues of lithium-ion batteries under extreme conditions.

SUMMARY

The first aspect of the present application provides an electrolyte, comprising: an organic solvent, an electrolyte lithium salt dissolved in the organic solvent, and an additive; the additive comprises a first additive and a second additive; wherein the first additive is selected from one or more of the compounds represented by Formula I:

Formula I

In the compound represented by Formula I, R1 is selected from —S(=O)$_2$—, —O—S(=O)$_2$—O—, —O—S(=O)$_2$—, —O—S(=O)—O— or 1,1-dioxo-tetrahydrothiophene-3,4-di-yl, $R^2$ and $R^3$ each are independently selected from saturated or unsaturated hydrocarbylene groups containing 1-10 carbon atoms, the H on the hydrocarbylene groups may be partially substituted or fully substituted by halo, nitro, cyano, carboxyl, sulfonic acid group;

The second additive is selected from one or more of the compounds represented by Formula II:

Formula II

Wherein $R^4$, $R^5$, $R^6$, $R^7$, $R^8$, $R^9$, $R^{10}$, $R^{11}$, $R^{12}$ each are independently selected from alkyl or haloalkyl containing 1-6 carbon atoms; X represents B, P or P=O;

It will be understood that when X represents B, P or P=O, the compound of Formula II is borate, phosphite or phosphate, respectively.

Under the synergistic effect of the first additive and the second additive, the lithium-ion battery can have better high-temperature cycle performance, high-temperature storage performance and lower low-temperature DC impedance, so that the lithium-ion battery has both better high-temperature performance and better low-temperature performance.

In any of the above embodiments, $R^1$ is selected from —S(=O)$_2$—, —O—S(=O)$_2$—O—, —O—S(=O)$_2$—, —O—S(=O)—O— or 1,1-dioxo-tetrahydrothiophene-3,4-di-yl, $R^2$ and $R^3$ each are independently selected from saturated or unsaturated hydrocarbylene groups containing 1-5 carbon atoms.

In any of the above embodiments, $R^2$ and $R^3$ each are independently selected from —CH$_2$—, —CH$_2$CH$_2$— or —CH$_2$CH$_2$CH$_2$—.

In any of the above embodiments, the first additive is selected from one or more of the following compounds:

Compound 1-1

Compound 1-2

-continued

Compound 1-3

Compound 1-4

Compound 1-5

The first additive can participate in film formation on the interfaces at the positive and negative electrodes, and the interface film formed on the positive electrode can effectively inhibit the electrolyte from being oxidatively decomposed on the surface of the positive electrode. In this way, on the one hand, the interface impedance of the positive electrode can be reduced, and on the other hand, the electrical contact of the positive electrode interface can be optimized.

In any of the above embodiments, the second additive is selected from one or more of the following compounds:

Formula II-1

Formula II-2

Formula II-3

Wherein $R^4$, $R^5$, $R^6$, $R^7$, $R^8$, $R^9$, $R^{10}$, $R^{11}$, $R^{12}$ each are independently selected from alkyl or haloalkyl containing 1-6 carbon atoms.

In any of the above embodiments, $R^4$, $R^5$, $R^6$, $R^7$, $R^8$, $R^9$, $R^{10}$, $R^{11}$, $R^{12}$ each are independently selected from —$CH_3$, —$CH_2CH_3$, —$CH_2CH_2CH_3$ or —$CH_2CH_2CH_2CH_3$.

In any of the above embodiments, the second additive is selected from one or more of the following compounds:
Compound 2-1: Tris(trimethylsilyl)phosphite,
Compound 2-2: Tris(trimethylsilyl)borate,
Compound 2-3: Tris(triethylsilyl)phosphite,
Compound 2-4: Tris(tri-n-propylsilyl)phosphite,
Compound 2-5: Tris(tri-n-butyl silyl)phosphite,
Compound 2-6: Tris(triethylsilyl)borate,
Compound 2-7: Tris(tri-n-propylsilyl)borate,
Compound 2-8: Tris(tri-n-butylsilyl)borate,
Compound 2-9: Tris(trimethylsilyl)phosphate,
Compound 2-10: Tris(triethylsilyl)phosphate,
Compound 2-11: Tris(tri-n-propylsilyl)phosphate,
Compound 2-12: Tris(tri-n-butylsilyl)phosphate.

The second additive can undergo complex exchange reactions with the main components in the interface film formed at the negative electrode interface, which help to form a more stable interface film at the negative electrode interface, and significantly reduce the impedance at the interface of the negative electrode interface, let the lithium-ions battery has good power performance.

In any of the above embodiments, the concentration of the first additive in the electrolyte is 0.1 wt %-3 wt %. It can prevent the electrolyte from further reacting, which can avoid the increase of the film resistance at the interface of the cathode active material layer and the electrolyte, and improve the battery performance.

In any of the above embodiments, the concentration of the second additive in the electrolyte is 0.05 wt %-2 wt %. It can prevent the first additive from reduction to form a film at the surface of the negative electrode, which can improve the cycle performance of the lithium-ion battery, facilitate the transmission of lithium-ions in the passivation film, and optimize the performance of the lithium-ion battery In any of the above embodiments, the electrolyte lithium salt is selected from one or more of: $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO and lithium Tetrafluoro[oxalate-O,O']phosphate; optionally, the electrolyte lithium salt is selected from one or more of: $LiPF_6$, $LiBF_4$, $LiSO_3F$, LiTFMSB, $LiPO_2F_2$, $LiN(SO_2CF_3)_2$, $LiN(SO_2F)_2$, LiBOB and LiPFO.

In any of the above embodiments, the concentration of the electrolyte lithium salt in the electrolyte is 0.5M-2M; optionally, the concentration of the electrolyte lithium salt in the electrolyte is 0.8M-1.2M.

The second aspect of the present application provides a lithium-ion battery, the lithium-ion battery comprises a positive electrode, a negative electrode, a separator, and the above-mentioned electrolyte of the first aspect of the present application.

The third aspect of the present application provides a battery module, the above-mentioned lithium-ion battery.

The fourth aspect of the present application provides a battery pack, the above-mentioned battery module.

The fifth aspect of the present application provides a device, comprising at least one of the above-mentioned lithium-ion battery, the above-mentioned battery module or the above-mentioned battery pack.

DETAILED DESCRIPTION

In order to illustrate the technical solutions of the embodiments of the present application more clearly, the following will briefly introduce the drawings that need to be used in the embodiments of the present application. Obviously, the drawings described below are only some implementations of FIG. 1 is a schematic diagram of an embodiment of a battery.

DETAILED DESCRIPTION

Below, embodiments of the disclosure will be further described in detail with reference to the drawings and embodiments. The detailed description according to the embodiments and the accompanying drawings are intended to exemplary illustrate the principles of the disclosure and are not intended to limit the scope of the disclosure, i.e., the disclosure is not limited to the described embodiments.

In the description of the disclosure, it should be noted that, unless otherwise stated, the meaning of "a plurality" is two or more; the orientation or positional relationship indicated by the terms "upper", "lower", "left", "right", "inner", "outer" and the like is merely for the purpose of describing the disclosure and simplifying the description, and is not intended to indicate or imply that the device or component referred to has a particular orientation, is constructed and operated in a particular orientation, and therefore cannot be understood to be a limitation of the disclosure. Moreover, the terms "first", "second", "third", and the like are configured for descriptive purposes only and are not to be construed as indicating or implying relative importance. "Vertical" is not strictly vertical, but within the allowable range of error. "Parallel" is not strictly parallel, but within the allowable range of error.

The orientations in the following description are all directions shown in the drawings and are not intended to limit specific structures of the disclosure. In the description of the disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the disclosure can be understood by the person skilled in the art according to actual circumstance.

For the sake of brevity, only certain numerical ranges are explicitly disclosed herein. However, any lower limit may be combined with any upper limit to form a range that is not explicitly described, and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value or combined with other lower or upper limits to form a range that is not explicitly specified.

In the description of the present application, it is to be noted that unless otherwise stated, the words "above" and "below" are inclusive of the case where it is equal to, and the word "more" in fragment "one or more" means two or more.

The above contents are not intended to describe each and every example or embodiment disclosed herein. More exemplary embodiments will be described below in more details by way of examples. At various places throughout the present application, a series of examples are provided to give teachings, and these examples can be combined in any way, if possible. In each example, the exemplification is just for illustrative purpose, and shall not be interpreted as enumeration.

First, the electrolyte according to the first aspect of the present application will be described in detail below.

The electrolyte according to the first aspect of the present application, comprises an organic solvent, an electrolyte lithium salt dissolved in the organic solvent and an additive, wherein the additive comprises a first additive and a second additive.

The first additive is selected from one or more of the compounds represented by Formula I:

Formula I

Wherein $R^1$ is selected from —S(=O)$_2$—, —O—S(=O)$_2$—O—, —O—S(=O)$_2$—, —O—S(=O)—O— or 1,1-dioxytetrahydrothiophene-3,4-di-yl $R^2$ and $R^3$ each are independently selected from saturated or unsaturated hydrocarbylene groups containing 1-10 carbon atoms, the H on the hydrocarbylene groups may be partially substituted or fully substituted by halo, nitro, cyano, carboxyl, sulfonic acid group.

In one embodiment of the present application, $R^1$ is selected from -S(=O)$_2$—.

In one embodiment of the present application, $R^1$ is selected from —O— is S(=O)$_2$—O—.

In one embodiment of the present application, $R^1$ is selected from —O—S(=O)$_2$—.

In one embodiment of the present application, $R^1$ is selected from —O—S(=O)—O—.

In one embodiment of the present application, $R^1$ is selected from 1,1-dioxo-tetrahydrothiophene-3,4-di-yl.

In one embodiment of the present application, $R^2$ and $R^3$ each are independently selected from saturated or unsaturated hydrocarbylene groups containing 1-5 carbon atoms. For example, including but not limited to, —CH$_2$—, —CH$_2$CH$_2$—, —CH$_2$CH$_2$CH$_2$—, —C(CH$_3$)$_2$—, —CH$_2$CH$_2$CH$_2$CH$_2$—, —CH(CH$_3$)CH$_2$CH$_2$—, —CH$_2$CH(CH$_3$)$_2$—, —CH$_2$CH$_2$CH$_2$CH$_2$CH$_2$—, —CH(CH$_3$)CH$_2$CH$_2$CH$_2$—, —CH$_2$CH(CH$_3$)CH$_2$CH$_2$—, —CH$_2$CH$_2$C(CH$_3$)$_2$—, —CH(C$_2$H$_5$)CH$_2$CH$_2$—, —C(CH$_3$)$_2$CH$_2$CH$_2$—, —CH(CH$_3$)C(CH$_3$)$_2$— and the like, or an unsaturated hydrocarbylene group in which one or more single bonds in the foregoing groups are replaced with double bonds or triple bonds.

In one embodiment of the present application, $R^2$ and $R^3$ each are independently selected from —CH$_2$—, —CH$_2$CH$_2$— or —CH$_2$CH$_2$CH$_2$—.

In one embodiment of the present application, $R^2$ is —CH$_2$—, $R^3$ is —CH$_2$CH$_2$—.

In one embodiment of the present application, $R^2$ and $R^3$ both are —CH$_2$CH$_2$—.

In one embodiment of the present application, $R^2$ is —CH$_2$CH$_2$—, $R^3$ is —CH$_2$CH$_2$CH$_2$—.

In one embodiment of the present application, $R^2$ and $R^3$ each are independently selected from saturated or unsaturated hydrocarbylene groups containing 1-5 carbon atoms as described above, the H on the saturated or unsaturated hydrocarbylene groups may be partially substituted or fully substituted by halogen atoms. The partial substitution here means that the H on the hydrocarbylene groups may be substituted by 1-6, 1-5 or 1-3 halogens. The halogen is selected from one or more of F, Cl, Br or I.

In one embodiment of the present application, $R^2$ and $R^3$ each are independently selected from saturated or unsaturated hydrocarbylene groups containing 1-5 carbon atoms as described above, the H on the saturated or unsaturated hydrocarbylene groups may be partially substituted or fully substituted by nitro. The partial substitution here means that the H on the hydrocarbylene groups may be substituted by 1-6, 1-5 or 1-3 nitro.

In one embodiment of the present application, $R^2$ and $R^3$ each are independently selected from saturated or unsaturated hydrocarbylene groups containing 1-5 carbon atoms as described above, the H on the saturated or unsaturated hydrocarbylene groups may be partially substituted or fully substituted by cyano. The partial substitution here means that the H on the hydrocarbylene groups may be substituted by 1-6, 1-5 or 1-3 cyano.

In one embodiment of the present application, $R^2$ and $R^3$ each are independently selected from saturated or unsaturated hydrocarbylene groups containing 1-5 carbon atoms as described above, the H on the saturated or unsaturated hydrocarbylene groups may be partially substituted or fully substituted by carboxyl. The partial substitution here means that the H on the hydrocarbylene groups may be substituted by 1-6, 1-5 or 1-3 carboxyl.

In one embodiment of the present application, $R^2$ and $R^3$ each are independently selected from saturated or unsaturated hydrocarbylene groups containing 1-5 carbon atoms as described above, the H on the saturated or unsaturated hydrocarbylene groups may be partially substituted or fully substituted by sulfonic acid group. The partial substitution here means that the H on the hydrocarbylene groups may be substituted by 1-6, 1-5 or 1-3 sulfonic acid groups.

In one embodiment of the present application, the first additive is selected from the following compounds:

Compound 1-1

Compound 1-2

Compound 1-3

Compound 1-4

Compound 1-5

The first additive can participate in film formation on the interfaces at the positive and negative electrodes, and the interface film formed on the positive electrode is usually called SEI film, which can effectively inhibit the electrolyte from being oxidatively decomposed at the surface of the positive electrode. In this way, on the one hand, it can prevent the product of oxidative decomposition of the electrolyte from depositing on the positive electrode interface and increasing the interface impedance of the positive electrode, and on the other hand, it can also prevent the electrolyte from being oxidatively decomposed at the positive electrode interface to produce gas and causing the interface electrical contact to deteriorate.

The second additive is selected from one or more of the Compounds represented by Formula II:

Formula II

Wherein $R^4$, $R^5$, $R^6$, $R^7$, $R^8$, $R^9$, $R^{10}$, $R^{11}$, $R^{12}$ each are independently selected from alkyl or haloalkyl containing 1-6 carbon atoms; X represents B, P or P=O;

It will be understood that when X represents B, P or P=O, the Compound of Formula II is borate, phosphite or phosphate, respectively.

In one embodiment of the present application, $R^4$, $R^5$, $R^6$, $R^7$, $R^8$, $R^9$, $R^{10}$, $R^{11}$, $R^{12}$ each are independently selected from alkyl containing 1-6 carbon atoms. For example, including but not limited to, —CH$_3$, —CH$_2$CH$_3$, —CH$_2$CH$_2$CH$_3$, —CH(CH$_3$)$_2$, —CH$_2$CH$_2$CH$_2$CH$_3$, —CH(CH$_3$)CH$_2$CH$_3$, —CH$_2$CH(CH$_3$)$_2$, —C(CH$_3$)$_3$, —CH$_2$CH$_2$CH$_2$CH$_2$CH$_3$, —CH(CH$_3$)CH$_2$CH$_2$CH$_3$, —CH$_2$CH(CH$_3$)CH$_2$CH$_3$, —CH$_2$CH$_2$CH(CH$_3$)$_2$, —CH(C$_2$H$_5$)CH$_2$CH$_3$, —C(CH$_3$)$_2$CH$_2$CH$_3$, —CH(CH$_3$)CH(CH$_3$)$_2$, —CH$_2$C(CH$_3$)$_3$.

In one embodiment of the present application, $R^4$, $R^5$, $R^6$, $R^7$, $R^8$, $R^9$, $R^{10}$, $R^{11}$, $R^{12}$ each are independently selected from —CH$_3$, —CH$_2$CH$_3$, —CH$_2$CH$_2$CH$_3$ or —CH$_2$CH$_2$CH$_2$CH$_3$.

In one embodiment of the present application, $R^4$, $R^5$, $R^6$, $R^7$, $R^8$, $R^9$, $R^{10}$, $R^{11}$, $R^{12}$ each are independently selected from —$CH_3$.

In one embodiment of the present application, $R^4$, $R^5$, $R^6$, $R^7$, $R^8$, $R^9$, $R^{10}$, $R^{11}$, $R^{12}$ each are independently selected from haloalkyl containing 1-6 carbon atoms, that is part or all of the hydrogen atoms of the above-mentioned alkyl groups are substituted by halogen atoms. The partial substitution here means that the H on the alkyl groups may be substituted by 1-6, 1-5 or 1-3 halogens. The halogen is selected from one or more of F, Cl, Br or I.

In one embodiment of the present application, the second additive is selected from one or more of compounds represented by Formula II-1, Formula II-2, Formula II-3:

Wherein, $R^4$, $R^5$, $R^6$, $R^7$, $R^8$, $R^9$, $R^{10}$, $R^{11}$, $R^{12}$ are defined as above.

In one embodiment of the present application, the second additive is selected from one or more of the following compounds:
Compound 2-1: Tris(trimethylsilyl)phosphite,
Compound 2-2: Tris(trimethylsilyl)borate,
Compound 2-3: Tris(triethylsilyl)phosphite,
Compound 2-4: Tris(tri-n-propylsilyl)phosphite,
Compound 2-5: Tris(tri-n-butylsilyl)phosphite,
Compound 2-6: Tris(triethylsilyl)borate,
Compound 2-7: Tris(tri-n-propylsilyl)borate,
Compound 2-8: Tris(tri-n-butylsilyl)borate,
Compound 2-9: Tris(trimethylsilyl)phosphate,
Compound 2-10: Tris(triethylsilyl)phosphate,
Compound 2-11: Tris(tri-n-propylsilyl)phosphate,
Compound 2-12: Tris(tri-n-butylsilyl)phosphate.

In one embodiment of the present application, the second additive is selected from the following compounds:
Compound 2-1: Tris(trimethylsilyl)phosphite,
Compound 2-2: Tris(trimethylsilyl)borate.

The second additive can undergo complex exchange reactions with the main components in the SEI film formed at the negative electrode interface, which help to form a more stable SEI film at the negative electrode interface, and significantly reduce the impedance of the negative electrode interface, let the lithium-ions battery has good power performance.

After the first additive and the second additive are used in combination, the first additive can form a film at the interface between the positive and negative electrodes to prevent the electrolyte from being oxidatively decomposed, and effectively inhibit the generation of gas in the lithium-ion battery, and can further prevent the second additive from being oxidatively decomposed at high-temperature. The second additive is preferentially reduced on the negative electrode to a film, which can improve the shortcomings of high impedance when the first additive forms a film at the negative electrode interface, and effectively reduce the increase of the reference DCR (Directive Current Resistance) during the use of the lithium-ion battery, and improve the power performance of the lithium-ion battery. Therefore, under the synergistic effect of the two, the lithium-ion battery can have better high-temperature cycle performance, high-temperature storage performance and lower low-temperature DC impedance, so that the lithium-ion battery has both better high-temperature performance and low-temperature performance.

Further, the inventor found that when the content of the first additive in the electrolyte was less than 0.1 wt %, because the content was too little, the cathode passivation film formed was not sufficient to prevent the electrolyte from further reacting, the improvement of the battery performance was not obvious; when the content was higher than 3 wt %, the impedance after complexation on the cathode was too large, which would increase the film resistance of the interface between the cathode active material layer and the electrolyte, thereby deteriorate the battery performance. Therefore, in one embodiment of the present application, the concentration of the first additive in the electrolyte is 0.1 wt %-3 wt %. For example, the concentration of the first additive in the electrolyte may be 0.1 wt %, 0.2 wt %, 0.5 wt %, 1 wt %, 1.5 wt %, 2 wt %, 2.5 wt % or 3 wt % and the like, including any value therein and all ranges and sub-ranges. For example, 0.5 wt %-3 wt %, 0.5 wt %-2 wt %, 1 wt %-1.5 wt %, 1 wt %-2 wt % and the like.

Further, the inventor found that when the content of the second additive in the electrolyte was too low, such as lower than 0.05 wt %, it could not prevent the first additive from reduction to form a film on the surface of the negative electrode, thereby it would deteriorate the cycle performance of the lithium-ion battery; when the content of the second additive in the electrolyte was higher, for example, higher than 2 wt %, it would form an excessively thick passivation film on the surface of the positive and negative electrodes, and make the impedance of the passivation film relatively high, which was not conducive to the transmission of lithium-ions in the passivation film, and increases the polarization of the battery, which would deteriorate the performance of the lithium-ion battery. Therefore, in one embodiment of the present application, the concentration of the second additive in the electrolyte is 0.05 wt %-2 wt %. For example, the concentration of the second additive in the electrolyte may be 0.05 wt %, 0.1 wt %, 0.2 wt %, 0.5 wt %, 1 wt %, 1.5 wt % or 2 wt % and the like, including any value therein and all ranges and sub-ranges. For example, 0.05 wt %-2 wt %, 0.5 wt %-1.5 wt %, 0.5 wt %-2 wt %, 1 wt %-1.5 wt %, 1 wt %-2 wt % and the like.

The type of organic solvent used in the present application is not specifically limited, and can be appropriately selected according to actual needs, as long as the technical solution of the present application can be realized. As an example, in one embodiment of the present application, the organic solvent is selected from one or more of ethylene carbonate, propylene carbonate, butylene carbonate, fluoroethylene carbonate, ethyl methyl carbonate, dimethyl carbonate, diethyl carbonate, dipropyl carbonate, methyl propyl carbonate, ethyl propyl carbonate, γ-butyrolactone, methyl propionate, methyl butyrate, ethyl acetate, ethyl propionate and ethyl butyrate.

In another embodiment of the present application, the organic solvent can also be selected from one or more of methyl acrylate, dimethyl sulfite, diethyl sulfite, acid anhydride, N-methylpyrrolidone, N-methylformamide, N-methylacetamide, acetonitrile, N,N-dimethylformamide, dimethyl sulfoxide, dimethyl sulfide, and tetrahydrofuran.

When the organic solvent is a mixed solvent of two or more solvents, their ratio is not particularly limited, and can be appropriately selected according to actual needs, as long as the technical solution of the present application can be realized. For example, in one embodiment of the present application, when the organic solvent contains two different organic solvents, they can be mix and used in a mass ratio of 1:1, 2:8, 3:7, 4:6, 8:2, 7:3, 6:4 and the like.

The content of the organic solvent in the electrolyte is not specifically limited, and can be appropriately selected according to actual needs, as long as the technical solution of the present application can be realized. As an example, in one embodiment of the present application, the content of the organic solvent in the electrolyte is 65 wt %-85 wt %; optionally, the content of the organic solvent in the electrolyte is 70 wt %-80 wt %. For example, the content of the organic solvent in the electrolyte may be 65 wt %, 70 wt %, 75 wt %, 80 wt %, 85 wt % and the like, including any value therein and all ranges and sub-ranges.

Similarly, the electrolyte lithium salt used in the present application is not specifically limited, and can be appropriately selected according to actual needs, as long as the technical solution of the present application can be realized. In one embodiment of the present application, the electrolyte lithium salt may be selected from the complexed lithium salt of Lewis acid and LiF. For example, selected from one or more of $LiPF_6$, $LiBF_4$, $LiAsF_6$, $LiSbF_6$, $LiPF_4(CF_3)_2$, $LiPF_3(C_2F_5)_3$, $LiPF_3(CF_3)_3$, $LiPF_3(iso-C_3F_7)_3$ and $LiPF_5(iso-C_3F_9)$, and $LiPF_6$, $LiBF_4$, $LiAsF_6$ are optional, $LiPF_6$, $LiBF_4$ are also optional.

In one embodiment of the present application, the electrolyte lithium salt may also be selected from imine lithium salt or methylated lithium salt. For example, selected from one or more of $LiN(SO_2F)_2$, $LiN(SO_2CF_3)_2$, $LiN(SO_2C_2F_5)_2$, $(CF_2)_2(SO_2)_2NLi$(cyclic), $(CF_2)_3(SO_2)_2NLi$(cyclic) and $LiC(SO_2CF_3)_3$, and $LiN(SO_2F)_2$, $LiN(SO_2CF_3)_2$ and/or $LiN(SO_2C_2F_5)_2$ are optional, $LiN(SO_2F)_2$ and/or $LiN(SO_2CF_3)_2$ are also optional.

In one embodiment of the present application, the electrolyte lithium salt may also be selected from lithium salt containing $S(=O)_2O$ structure. For example, selected from one or more of $LiSO_3F$, $LiCF_3SO_3$, $CH_3SO_4Li$, $C_2H_5SO_4Li$, $C_3H_7SO_4Li$, Lithium trifluoro((methylsulfonyl)oxy) borate (LiTFMSB), and Lithium pentafluoro((methylsulfonyl)oxy) phosphate (LiPFMSP), and $LiSO_3F$, $CH_3SO_4Li$, $C_2H_5SO_4Li$ and/or LiTFMSB are optional.

In one embodiment of the present application, the electrolyte lithium salt may also be selected from lithium salt containing P=O or Cl=O structure. For example, selected from one or more of $LiPO_2F_2$, $Li_2PO_3F$ and $LiClO_4$, and $LiPO_2F_2$ and/or $Li_2PO_3F$ are optional.

In one embodiment of the present application, the electrolyte lithium salt may also be selected from lithium salt with oxalate ligand as anion. For example, one or more of lithium bis[oxalate-O,O']borate (LiBOB), lithium difluoro[oxalate-O,O']borate, lithium difluorobis[oxalate-O,O']phosphate (LiPFO) and lithium Tetrafluoro[oxalate-O,O'] phosphate, and LiBOB and/or LiPFO are optional.

In one embodiment of the present application, the electrolyte lithium salt may also be selected from one or more of $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO and lithium Tetrafluoro[oxalate-O,O'] phosphate, and one or more of $LiPF_6$, $LiBF_4$, $LiSO_3F$, LiTFMSB, $LiPO_2F_2$, $LiN(SO_2CF_3)_2$, $LiN(SO_2F)_2$, LiBOB and LiPFO are optional, $LiPF_6$ are more optional The concentration of the electrolyte lithium salt in the electrolyte is not specifically limited, and can be appropriately selected according to actual needs, as long as the technical solution of the present application can be realized. In one embodiment of the present application, the concentration of the electrolyte lithium salt in the electrolyte is 0.5M-2M ($M=mol \cdot L^{-1}$), 0.8M-1.2M is optional. For example, the concentration of the electrolyte lithium salt in the electrolyte is 0.5M, 0.8M, 1.0M, 1.2M, 1.5M or 2.0M, including any value therein and all ranges and sub-ranges. For example, 0.5M-2M, 0.5M-1.5M, 0.8M-1.2M, 1.0M-2.0M, 1.0M-1.5M and the like.

Next, the lithium-ion battery according to the second aspect of the present application will be described in detail.

The lithium-ion battery of the second aspect of the present application comprises a positive electrode, a negative electrode, a separator, and the electrolyte according to any embodiment of the first aspect of the present application.

The positive electrode is not specifically limited, and can be appropriately selected according to actual needs, and can be those positive electrodes commonly used in the lithium-ion battery, as long as the technical solution of the present application can be realized. As an example, in one embodiment of the present application, the positive electrode includes a positive electrode active material that can extract and accept lithium-ions. The positive electrode active material is selected from lithium transition metal composite oxides, including, but not limited to, lithium cobalt oxide, lithium nickel oxide, lithium manganese oxide, lithium nickel manganese oxide, lithium nickel cobalt manganese oxide, and lithium nickel cobalt aluminum oxide, compounds obtained by adding other transition metals or non-transition metals to these lithium transition metal oxides, and a mixture of one or more of the above substances and the like.

The negative electrode is not specifically limited, and can be appropriately selected according to actual needs, and can be those negative electrodes commonly used in the lithium-ion battery, as long as the technical solution of the present application can be realized. As an example, in one embodiment of the present application, the negative electrode includes a negative electrode active material that can accept and extract lithium-ions. The negative electrode active material is selected from soft carbon, hard carbon, artificial graphite, natural graphite, silicon, silicon-oxygen compound, silicon-carbon composite, lithium titanate, metals capable of forming alloys with lithium, and the like.

The material of the separator is not limited and can be selected according to actual needs. In an embodiment of the present application, the separator is a polyethylene film (PE) of 12 μm.

Generally, in specific applications, the positive electrode needs to be further processed into a positive electrode plate for use, and the structure and preparation method of the positive electrode plate are known in the art. For example, the positive electrode active material, conductive agent, binder and the like are uniformly mixed in an organic solvent, and then coated on a metal (for example, Al foil), dried and cold pressed to obtain a positive electrode plate.

Similarly, in specific applications, the negative electrode needs to be further processed into a negative electrode plate for use, and the structure and preparation method of the negative pole piece are known in the art. For example, the negative electrode active material, conductive agent, binder and the like are uniformly mixed in an organic solvent, and then coated on a metal (for example, Cu foil), dried and cold pressed to obtain a negative electrode plate.

The conductive agent, binder, and organic solvent are all conventional reagents used in the lithium-ion battery, and will not be repeated here.

Figure 1:
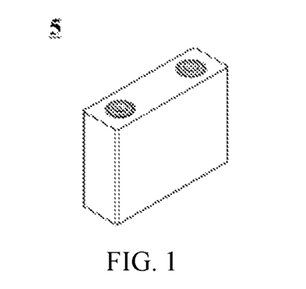

The present application has no particular limitation on the shape of the lithium-ion battery, which can be cylindrical, square, or any other shape. FIG. 1 shows a battery 5 with a square structure as an example.

Figure 2:
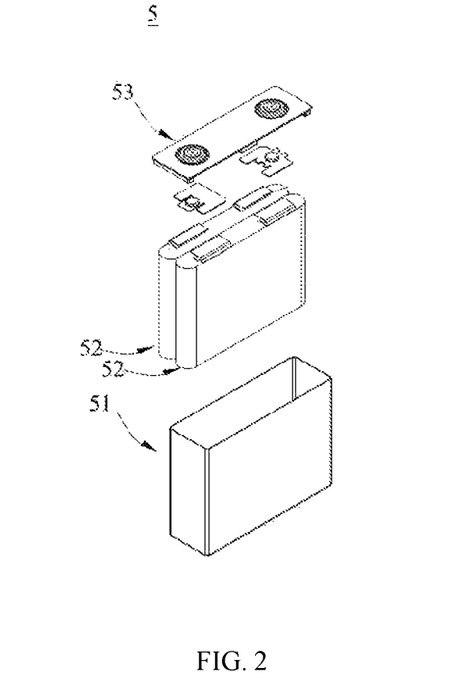
FIG. 2 is an exploded view of FIG. 1.

In some embodiments, referring to FIG. 2, the outer package may include a shell 51 and a cover plate 53. Wherein, the shell 51 may include a bottom plate and side plates connected to the bottom plate, and the bottom plate and the side plates are enclosed to form a receiving cavity. The shell 51 has an opening communicated with the receiving cavity, and the cover plate 53 can cover the opening to close the receiving cavity. The positive electrode plate, the negative electrode plate and the separator may be formed into an electrode assembly 52 through a winding process or a lamination process. The electrode assembly 52 is packaged in the receiving cavity. The electrolyte is infiltrated in the electrode assembly 52. The number of electrode assemblies 52 contained in the battery 5 can be one or more, which can be adjusted according to requirements.

After the electrolyte of the present application is applied to a lithium-ion battery, the lithium-ion battery can have better high-temperature cycle performance, high-temperature storage performance, and lower low-temperature DC impedance, so that the lithium-ion battery has both better high-temperature performance and low-temperature performance. The reason is that the bis-nitrile in the sulfur-containing bis-nitrile compound is complexed with the positive electrode to reduce the side reaction of the interface at high temperature and inhibit the gas production of the secondary battery at high-temperature. At the same time, the sulfur-containing group can form a film on the positive electrode, which greatly reduces the impedance when the bis-nitrile is complexed at the surface of the positive electrode, but because the reduction potential of the sulfur-containing bis-nitrile is higher than that of organic solvents, it will form lithium sulfite at the negative electrode interface; the nitrile group of the sulfur-containing bis-nitrile has a strong electron-absorbing characteristic such that it is easy to obtain electrons in the negative electrode to undergo a reduction reaction, and its reduction products are unstable and deposit on the negative electrode, which affect the cycle performance of the secondary battery. When at least one of silylphosphate compound, silylphosphite compound, and silylborate compound is added to the electrolyte, the silyl additives can form a film at the surface of the negative electrode so as to improve the composition of the SEI film and effectively reduce the negative electrode interface impedance. Therefore, a two-stage injection solution is used to make battery cores. Firstly, only the first electrolyte containing the silyl compound additives is injected in the formation stage, and then the second electrolyte containing the sulfur-containing bis-nitrile compound additives is injected in the capacity stage. By doing so, the silyl compound additives can preferentially form a film at the surface of the negative electrode, and inhibit the side reaction of the sulfur-containing bis-nitrile compound additive on the negative electrode. Therefore, under the synergistic effect of the additives of the silyl-containing compound and the sulfur-containing bis-nitrile compound, the high-temperature storage performance, high-temperature cycle performance, and low-temperature performance of the secondary battery can be improved at the same time.

The third aspect of the present application provides a battery module. The lithium-ion battery provided in the second aspect of the present application can be assembled into the battery module of the third aspect of the present application, and the battery module may include a plurality of batteries, the specific number of which can be adjusted according to the application and capacity of the battery module.

Figure 3:
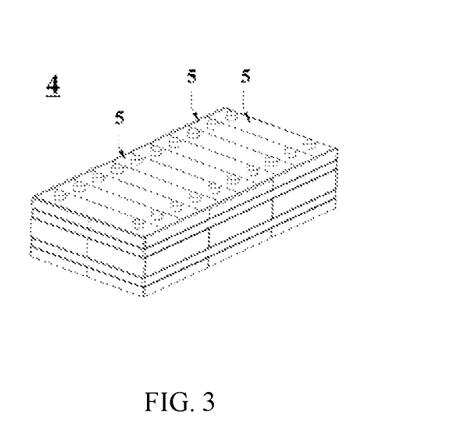
FIG. 3 is a schematic diagram of an embodiment of a battery module.

FIG. 3 shows a battery module 4 as an example. Referring to FIG. 3, in the battery module 4, the plurality of batteries 5 may be arranged sequentially in a length direction of the battery module 4. Apparently, they may also be arranged in any other way. Further, the plurality of batteries 5 can be fixed by fasteners.

Optionally, the battery module 4 may further include a case with a receiving space, and the plurality of batteries 5 are received in the receiving space.

The fourth aspect of the present application provides a battery pack, the battery module provided in the third aspect of the present application may be assembled into the battery pack, and the number of battery modules included in the battery pack can be adjusted according to the application and capacity of the battery pack.

Figure 4:
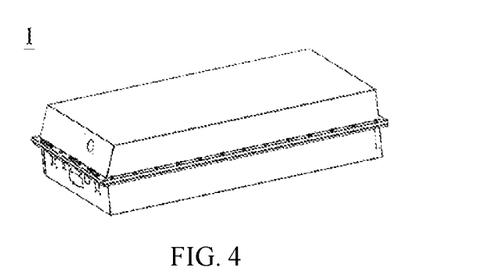
FIG. 4 is a schematic diagram of an embodiment of a battery pack.
Figure 5:
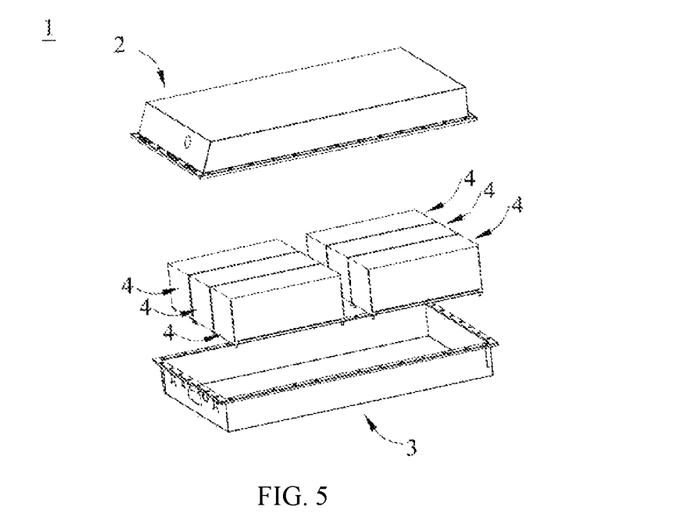
FIG. 5 is an exploded view of FIG. 4.

FIGS. 4 and 5 show a battery pack 1 as an example. Referring to FIGS. 4 and 5, the battery pack 1 may include a battery case and a plurality of battery modules 4 disposed in the battery case. The battery case includes an upper case member 2 and a lower case member 3. The upper case member 2 can cover the lower case member 3 to form a closed space for receiving the battery modules 4. A plurality of battery modules 4 can be arranged in the battery case in any manner The fifth aspect of the present application provides a device, the device comprises at least one of the lithium-ion battery, battery module or battery pack of the present application. The lithium-ion battery, battery module or battery pack can be used as the power source of the device, and can also be used as the energy storage unit of the device. The device may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc.

The device may select lithium-ion batteries, battery modules or battery packs, according to its usage requirements.

Figure 6:
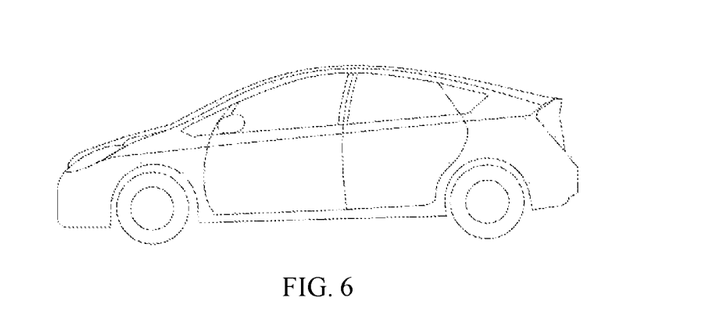
FIG. 6 is a schematic diagram of an embodiment of a device.

FIG. 6 shows a device as an example. The device is a pure electric vehicle, a hybrid electric vehicle, or a plug-in hybrid electric vehicle. In order to meet the requirements of the device for high power and high energy density of the lithium-ion battery, the battery pack or battery module can be used.

As another example, the device may be a mobile phone, a tablet computer, a notebook computer, etc. The device is generally required to be thin and light, and the lithium-ion battery can be used as a power source.

EXAMPLES

The application will be further elaborated below in conjunction with specific embodiments. It should be understood that the following exemplary embodiments are only used for illustration and do not limit the application. Unless otherwise stated, all reagents used in the examples are commercially available or synthesized according to conventional methods, and can be used directly without further processing. The experimental conditions not specified in the examples adopt conventional conditions, or adopt conditions recommended by material suppliers or equipment suppliers.

Examples 1-21

The lithium-ion battery containing the electrolyte of the present application of examples 1-21 was prepared according to the following method.

Preparation of Positive Electrode Plate and Negative Electrode Plate

After the positive electrode active material $LiNi_{0.5}Mn_{0.3}Co_{0.2}O_2$, the conductive agent acetylene black, and the binder polyvinylidene fluoride (PVDF) are fully stirred and evenly mixed in the N-methylpyrrolidone solvent system in a weight ratio of 94:3:3, it is coated on an Al foil, dried, and cold pressed to obtain a positive electrode plate.

After the negative active material artificial graphite, the conductive agent acetylene black, the binder styrene-butadiene rubber (SBR), and the thickener sodium carbon methyl cellulose (CMC) are fully stirred and evenly mixed in the deionized water-solvent system in a weight ratio of 95:2:2:1, it is coated on a Cu foil, dried, and cold pressed to obtain a negative electrode plate.

Preparation of Electrolyte

In a glove case filled with argon gas, ethylene carbonate (EC) and diethyl carbonate (DEC) are mixed in a mass ratio of EC:DEC=20:80 as an organic solvent. Lithium hexafluorophosphate is added to the organic solvent to obtain a lithium salt with a concentration of 1.0 mol/L, and then the first additive and the second additive are added to it respectively, after mixed uniformly, the electrolyte A and the electrolyte B are obtained.

Preparation of Lithium-Ion Battery

A 12 μm polyethylene film (PE) was used as the separator. Stake the prepared positive electrode plate, separator, and negative electrode plate in order, so that the separator is in the middle of the positive and negative electrode plates, then wind to obtain a bare battery core, and weld the tabs, and then put the bare battery core in the outer package, inject the electrolyte B prepared above into the dried bare battery core, encapsulate, stand still, then charge to 3.3V with a constant current of 0.02 C, then charge to 3.6V with a constant current of 0.1 C, and reshape; After shaping, inject electrolyte A into the battery core, charge to 4.4V with a constant current of 0.33 C, then charge to 0.05 C current with a constant voltage of 4.4V, then discharge to 2.8V with a constant current of 1 C, capacity test and complete the preparation of the lithium-ion battery. The prepared soft-packed lithium-ion battery has a thickness of 4.0 mm, a width of 60 mm, and a length of 140 mm.

Comparative Examples 1-19

The preparation method of the lithium-ion battery of comparative examples 1-19 was basically similar to that of examples 1-21, except that only electrolyte B or A was added during the preparation of the lithium-ion battery.

Performance Test

Cycle Performance Test of the Lithium Ion Battery

At 45° C., after charged the lithium-ion battery to 4.2V with a constant current of 1 C, charged to 0.05 C current with a constant voltage of 4.2V, and then discharged to 2.8V with a constant current of 1 C, the above was a charge-discharge cycle. Then carry out 1000 cycles of charge/discharge test according to the above conditions.

The capacity retention rate of the lithium ion battery after 1,000 cycles (%)=(discharge capacity at the 1000th cycle/discharge capacity at the first cycle)×100%.

High Temperature Storage Volume Expansion Test of Lithium Ion Battery

At 25° C., the lithium-ion battery was allowed to stand for 30 minutes, and then charged to 4.2V voltage with a constant current of 1 C, and then charged to 0.05 C current with a constant voltage of 4.2V. At this time, the volume of the lithium-ion battery was tested and recorded as V0; then the fully charged lithium-ion battery was put in a thermostat at 85° C. and stored for 30 days, after which the water displacement method was used to test the volume which was recorded as V1.

The volume expansion rate of the lithium-ion battery after being stored at 80° C. for 30 days (%)= $(V1-V0)/V0 \times 100\%$.

High Temperature Storage Performance Test of Lithium-Ion Battery

At 25° C., the lithium-ion battery was charged to 4.2V voltage with a constant current of 1 C, then charged to 0.05

C current with a constant voltage of 4.2V, and then discharged to 2.8V voltage with a constant current of 1 C, the discharge capacity of the lithium-ion battery at this time was tested, and recorded as C0; then the lithium-ion battery was charged to 4.2V voltage with a constant current of 1 C, and then charged to 0.05 C current with a constant voltage of 4.2V, and the lithium-ion battery was placed in a thermostat at 60° C., keep the temperature for 120 days, take out the lithium-ion battery, discharge to 2.8V voltage with a conrecorded as U1, then discharged for 10 s with a rate of 0.3 C, and the discharge voltage of the lithium-ion battery was test and recorded as U2.

The DCR of the lithium ion battery at 25° C.=(U1−U2)/I, where I represents Current.

Table 1 shows the performance test results of the lithium-ion batteries of examples 1-9 and Comparative examples 1-8.

TABLE 1

| | Additives and Added Amounts (wt %) | | Electrical Properties | | | |
|---|---|---|---|---|---|---|
| | | | Capacity retention rate after 1000 cycles | Volume expansion rate after storage at 85° C. for | Capacity retention rate after storage at 60° C. for | DCR/mΩ |
| | The First Additive | The Second Additive | at 45° C. | 30 days | 120 days | at 25° C. |
| Example 1 | 0.1% Compound 1-1 | 0.5% Compound 2-1 | 85.8% | 16.2% | 86.8% | 320.1 |
| Example 2 | 1% Compound 1-1 | 0.5% Compound 2-1 | 90.2% | 10.1% | 91.3% | 340.3 |
| Example 3 | 3% Compound 1-1 | 0.5% Compound 2-1 | 92.3% | 5.2% | 93.8% | 550.2 |
| Example 4 | 1% Compound 1-1 | 0.05% Compound 2-1 | 90.1% | 10.0% | 91.0% | 430.2 |
| Example 5 | 1% Compound 1-1 | 1% Compound 2-1 | 89.8% | 11.2% | 89.9% | 310.3 |
| Example 6 | 1% Compound 1-1 | 2% Compound 2-1 | 87.8% | 13.9% | 86.8% | 330.5 |
| Example 7 | 1% Compound 1-1 | 0.5% Compound 2-2 | 90.0% | 10.4% | 90.8% | 354.2 |
| Example 8 | 1% Compound 1-1 | 0.5% Compound 2-3 | 89.8% | 10.9% | 90.7% | 356.7 |
| Example 9 | 1% Compound 1-1 | 0.5% Compound 2-4 | 89.6% | 10.8% | 90.2% | 357.8 |
| Example 10 | 1% Compound 1-1 | 0.5% Compound 2-5 | 89.3% | 11.2% | 90.5% | 359.2 |
| Example 11 | 1% Compound 1-1 | 0.5% Compound 2-6 | 89.2% | 11.1% | 90.4% | 358.9 |
| Example 12 | 1% Compound 1-1 | 0.5% Compound 2-7 | 89.6% | 11.0% | 89.2% | 359.8 |
| Example 13 | 1% Compound 1-1 | 0.5% Compound 2-8 | 89.8% | 10.7% | 89.1% | 360.2 |
| Example 14 | 1% Compound 1-1 | 0.5% Compound 2-9 | 88.8% | 10.8% | 89.0% | 360.3 |
| Example 15 | 1% Compound 1-1 | 0.5% Compound 2-10 | 88.9% | 10.5% | 88.8% | 360.1 |
| Example 16 | 1% Compound 1-1 | 0.5% Compound 2-11 | 88.1% | 10.6% | 88.4% | 361.2 |
| Example 17 | 1% Compound 1-1 | 0.5% Compound 2-12 | 88.6% | 11.4% | 88.0% | 360.0 |
| Example 18 | 1% Compound 1-2 | 0.5% Compound 2-1 | 89.9% | 10.9% | 90.9% | 355.1 |
| Example 19 | 1% Compound 1-3 | 0.5% Compound 2-1 | 89.3% | 11.0% | 90.4% | 358.1 |
| Example 20 | 1% Compound 1-4 | 0.5% Compound 2-1 | 89.0% | 11.2% | 90.4% | 359.9 |
| Example 21 | 1% Compound 1-5 | 0.5% Compound 2-1 | 88.5% | 11.6% | 91.2% | 363.3 |
| Comparative Examples 1 | \ | \ | 70.2% | 54.5% | 81.0% | 270.4 |
| Comparative Examples 2 | 1% Compound 1-1 | \ | 89.1% | 8.8% | 91.2% | 450.2 |
| Comparative Example 3 | 1% Compound 1-2 | \ | 88.3% | 11.2% | 90.4% | 457.8 |
| Comparative Example 4 | 1% Compound 1-3 | \ | 87.9% | 12.4% | 90.3% | 458.9 |
| Comparative Examples 5 | 1% Compound 1-4 | \ | 86.8% | 12.9% | 90.6% | 459.8 |
| Comparative Examples 6 | \ | 0.5% Compound 2-1 | 69.7% | 50.6% | 78.1% | 210.5 |
| Comparative Example 7 | \ | 0.5% Compound 2-2 | 68.5% | 53.1% | 77.7% | 220.3 |
| Comparative Example 8 | \ | 0.5% Compound 2-3 | 68.4% | 50.9% | 77.5% | 222.1 |
| Comparative Example 9 | \ | 0.5% Compound 2-4 | 68.5% | 51.2% | 77.2% | 223.1 |
| Comparative Example 10 | \ | 0.5% Compound 2-5 | 68.3% | 53.2% | 77.4% | 222.9 |
| Comparative Example 11 | \ | 0.5% Compound 2-6 | 68.5% | 52.1% | 77.7% | 223.4 |
| Comparative Example 12 | \ | 0.5% Compound 2-7 | 68.1% | 52.8% | 77.4% | 221.5 |
| Comparative Example 13 | \ | 0.5% Compound 2-8 | 67.9% | 53.1% | 77.6% | 225.2 |
| Comparative Example 14 | \ | 0.5% Compound 2-9 | 67.4% | 54.9% | 76.9% | 223.5 |
| Comparative Example 15 | \ | 0.5% Compound 2-10 | 67.8% | 54.5% | 76.8% | 224.5 |
| Comparative Example 16 | \ | 0.5% Compound 2-11 | 67.2% | 54.2% | 76.9% | 227.9 |
| Comparative Example 17 | \ | 0.5% Compound 2-12 | 66.9% | 54.9% | 76.0% | 228.1 |
| Comparative Example 18 | 3% Compound 1-1 | \ | 92.2% | 5.6% | 93.3% | 650.2 |
| Comparative Example 19 | \ | 3% Compound 2-1 | 60.4% | 60.1% | 73.2% | 300.5 | stant current of 1 C, the discharge capacity of the lithium-ion battery at this time was test and recorded as C1.

The capacity retention rate of the lithium-ion battery after being stored at 60° C. for 120 days (%)=C1/C0×100

Room Temperature Direct Current Impedance (DCR) Test of the Lithium-Ion Battery

At 25° C., the state of charge (SOC) of the lithium-ion battery was adjusted to 20% of the full charge capacity, and the lithium-ion battery was placed in a high and low temperature case at −25° C. and let it stand for 2 hours to make the temperature of the lithium ion battery to −25° C., the voltage of the lithium-ion battery at this time was test and It can be seen from the test results of comparative examples 1-5 that by adding the first additive to the electrolyte, the high-temperature cycle capacity retention rate, high-temperature storage volume expansion rate, and high-temperature storage capacity retention rate of the lithium-ion battery get a certain improve, but the low-temperature DC resistance of the lithium-ion batteries increases. It can be seen from the test results of comparative example 1 and comparative examples 6-17 that by adding the second additive to the electrolyte can significantly reduce the low-temperature DC impedance of the lithium-ion battery, but the high-temperature cycle capacity retention rate and high-temperature storage capacity retention rate of the lithium-ion battery deteriorate significantly.

It can be seen from the test results of examples 1-21 that by adding the first additive and the second additive to the electrolyte at the same time, the lithium-ion batteries can be made to have higher high-temperature cycle capacity retention rate and higher temperature storage capacity retention rate as well as lower high-temperature storage volume expansion rate, and also have lower low-temperature DC resistance at the same time. That is, when the first additive and the second additive are used in combination, it can play a role in improving the high-temperature performance of the lithium ion battery and at the same time avoiding the deterioration of the low-temperature DC resistance caused by the second additive compound.

It can be known from examples 1-3 and comparative example 1 that as the content of the second additive increases, the high-temperature performance continues to improve, but the low-temperature resistance first decreases and then increases. This may be due to the excessive content of the sulfur-containing bis-nitrile compound, resulting in the thick passivation layer after complexation of the sulfur-containing bis-nitrile compound with the positive electrode, which affects the transmission of lithium ions at the surface of the positive electrode at low-temperatures, and therefore exhibits relatively poor low-temperature DC resistance.

It can be seen from examples 4-6 and comparative example 5 that as the content of the second additive increases, the low-temperature DC resistance gradually decreases, but when the content is higher, the high-temperature cycle capacity retention rate and the high-temperature storage capacity retention rate will relatively worse, but still better than comparative examples 6-17 and 19.

The above-described embodiments may be appropriately modified and varied by those skilled in the art in light of the disclosure and guidance of the above specification. Therefore, the present application is not limited to the specific embodiments as disclosed and described above, and the modifications and variations of the application are intended to fall within the scope of the appended claims. In addition, although some specifically defined terms are used in the specification, these terms are merely used for convenience of description and do not impose any limitation on the present application.

Although the description of the present application is made with reference to specific embodiments, various modifications may be made thereto or parts thereof may be replaced with their equivalents without departing from the scope of the present application. The technical features described in all the embodiments may be combined in any appropriate way as long as no structural conflict occurs. Therefore, the present application is not limited to the specific embodiments as disclosed and described above, but covers all that fall within the scope of the claims.

What is claimed is:
1. An electrolyte, comprising:
an organic solvent;
an electrolyte lithium salt dissolved in the organic solvent; and
an additive comprising a first additive and a second additive,
the first additive being selected from one or more of the following compounds:

Compound 1-1

Compound 1-2

Compound 1-3

Compound 1-4

Compound 1-5 the second additive being selected from one or more of the following compounds:
Compound 2-1: Tris(trimethylsilyl)phosphite,
Compound 2-2: Tris(trimethylsilyl)borate,
Compound 2-3: Tris(triethylsilyl)phosphite,
Compound 2-4: Tris(tri-n-propylsilyl)phosphite,
Compound 2-5: Tris(tri-n-butylsilyl)phosphite,
Compound 2-6: Tris(triethylsilyl)borate,
Compound 2-7: Tris(tri-n-propylsilyl)borate,
Compound 2-8: Tris(tri-n-butylsilyl)borate,
Compound 2-9: Tris(trimethylsilyl)phosphate,
Compound 2-10: Tris(triethylsilyl)phosphate,
Compound 2-11: Tris(tri-n-propylsilyl)phosphate,
Compound 2-12: Tris(tri-n-butylsilyl)phosphate, and
wherein the concentration of the first additive in the electrolyte is 0.1wt%-3wt% and the concentration of the second additive in the electrolyte is 0.05wt%-2wt%.

2. The electrolyte according to claim 1, wherein the electrolyte lithium salt selected from one or more of: $LiPF_6$, $LiPO_2F_2$, $Li_2PO_3F$, $LiBF_4$, $LiSO_3F$, LiTFMSB, $LiN(SO_2F)_2$, $LiN(SO_2CF_3)_2$, $LiN(SO_2C_2F_5)_2$, LiBOB, LiPFO and lithium Tetrafluorophosphate; optionally, the electrolyte lithium salt is selected from one or more of: $LiPF_6$, $LiBF_4$, $LiSO_3F$, LiTFMSB, $LiPO_2F_2$, $LiN(SO_2CF_3)_2$, $LiN(SO_2F)_2$, LiBOB and LiPFO.

3. The electrolyte according to claim 1, wherein the concentration of the electrolyte lithium salt in the electrolyte is 0.5M-2M; optionally, the concentration of the electrolyte lithium salt in the electrolyte is 0.8M-1.2M.

4. A lithium-ion battery, comprising a positive electrode, a negative electrode, a separator, and the electrolyte according to claim 1.

5. A battery module, comprising the lithium-ion battery of claim 4.

6. A battery pack, comprising the battery module of claim 5.

7. A device, comprising the lithium-ion battery of claim 4.

* * * * *